(12) United States Patent
Jin

(10) Patent No.: US 8,750,532 B2
(45) Date of Patent: Jun. 10, 2014

(54) ZOOM MOTOR NOISE REDUCTION FOR CAMERA AUDIO RECORDING

(75) Inventor: Qu Gary Jin, Kanata (CA)

(73) Assignee: Microsemi Semiconductor ULC, Ottawa, Ontario (CA)

( * ) Notice: Subject to any disclaimer, the term of this patent is extended or adjusted under 35 U.S.C. 154(b) by 622 days.

(21) Appl. No.: 13/048,108

(22) Filed: Mar. 15, 2011

(65) Prior Publication Data

US 2011/0305348 A1    Dec. 15, 2011

(30) Foreign Application Priority Data

Apr. 6, 2010    (GB) .................................. 1005697.6

(51) Int. Cl.
*G10L 21/0208* (2013.01)
*G03B 5/00* (2006.01)
*G03B 3/10* (2006.01)
*G02B 7/10* (2006.01)

(52) U.S. Cl.
CPC ...................................... *G02B 7/102* (2013.01)
USPC ....... 381/71.7; 381/94.1; 381/94.2; 381/94.3; 381/97; 396/55; 396/85; 396/133

(58) Field of Classification Search
USPC ........ 381/71.7, 94.1, 94.2, 94.3, 97; 348/374, 348/376, 240.2, 254, 222.1; 396/85, 133, 396/55
See application file for complete search history.

(56) References Cited

U.S. PATENT DOCUMENTS

| | | | |
|---|---|---|---|
| 6,208,618 B1 * | 3/2001 | Kenney et al. ................. | 370/216 |
| 6,738,445 B1 * | 5/2004 | Soulodre ........................ | 375/377 |
| 2006/0047507 A1 * | 3/2006 | Van der Burgt et al. ...... | 704/226 |
| 2006/0140613 A1 | 6/2006 | Aikawa | |
| 2006/0227018 A1 * | 10/2006 | Ejima et al. ..................... | 341/50 |
| 2011/0081026 A1 * | 4/2011 | Ramakrishnan et al. .... | 381/94.3 |

FOREIGN PATENT DOCUMENTS

| | | |
|---|---|---|
| JP | 2003309999 | 4/2002 |
| JP | 2006186819 | 12/2004 |
| JP | 2009164962 | 1/2008 |

* cited by examiner

*Primary Examiner* — Duc Nguyen
*Assistant Examiner* — George Monikang
(74) *Attorney, Agent, or Firm* — Marks & Clerk; Richard J. Mitchell

(57) ABSTRACT

Zoom motor noise in a camera audio recording is reduced by detecting activity of the zoom motor, transforming a audio signal into the frequency domain during zoom motor activity, and scaling the frequency domain signal during zoom motor activity in each of a series of frequency bins by a scaling factor derived from a pre-stored zoom motor noise spectrum to produce a processed audio signal in the frequency domain. The processed audio signal is then transformed back to the time domain.

11 Claims, 2 Drawing Sheets

ZOOM MOTOR NOISE REDUCTION FOR CAMERA AUDIO RECORDING

FIELD OF INVENTION

This invention relates to the field of video cameras, and in particular to a method of reducing zoom motor noise in camera audio recorders.

BACKGROUND OF THE INVENTION

One of the primary sources of noise in the video camera recording is the motor that controls the zooming in and out of the optical lens. This noise is audible and creates undesirable noise artifacts.

An object of the invention is to reduce the effect of this noise.

SUMMARY OF THE INVENTION

According to the present invention there is provided a method of reducing zoom motor noise in a camera audio recording, comprising: detecting activity of the zoom motor; transforming a audio signal into a frequency domain signal during zoom motor activity; scaling the frequency domain signal during zoom motor activity in each of a series of frequency bins by a scaling factor derived from a pre-stored zoom motor noise spectrum to produce a processed audio signal in the frequency domain; and transforming the processed audio signal back to the time domain.

The audio signal is typically a voice signal, but it could also represent other forms of audio, such as music.

The input signal is processed only when the zoom motor is active, which may be indicated by a motor noise indicator bit. Otherwise, the signal is bypassed with a delay matching the processed signal delay. To maintain audio continuity, this delay will equal to the motor noise processor and block data memory delay.

Low-level white noise may added to mask the artifact due to the processing of the audio signal.

According to another aspect of the invention there is provided a noise reduction circuit for reducing zoom motor noise in a camera audio recorder, comprising: a zoom motor activity detector; a signal processor configured to transform a audio signal into the frequency domain during zoom motor activity to obtain a frequency domain signal, scale the frequency domain signal in each of a series of frequency bins by a scaling factor derived from a pre-stored motor noise spectrum during zoom motor activity to produce a processed audio signal in the frequency domain, and transform the processed audio signal back to the time domain.

The noise reduction circuit is simple to implement and has a very small MIPS requirement.

BRIEF DESCRIPTION OF THE DRAWINGS

The invention will now be described in more detail, by way of example only, with reference to the accompanying drawings, in which;—

DETAILED DESCRIPTION OF EXEMPLARY EMBODIMENT

Figure 1:
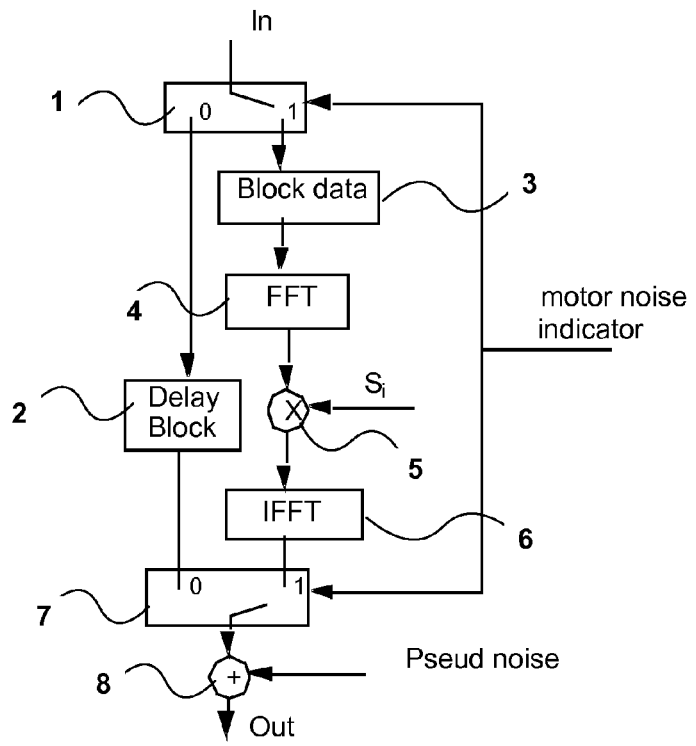
FIG. 1 is a block diagram of a noise reduction system in accordance with one embodiment of the invention.

FIG. 1 is a block diagram of one embodiment of a motor noise reduction system.

The digital input signal In is passed through a multiplexor 1 either to a delay module 2 or to a module 3 for collecting blocks of data, typically 1024 samples. The multiplexor 1 is controlled by a motor noise indicator bit, which is generated when the motor is active.

Each block of data from module 3 is passed through N point (typically 1024) FFT module 4, which transforms the signal to the frequency domain by performing a fast Fourier transform.

For each frequency bin i, the audio signal is scaled down by a frequency related scaling factor Si<1 in multiplier 5 to reduce the signal level for motor noise reduction. The scaled frequency domain signal is passed through N point IFFT 6 to transform the signal back to the time domain and produce a motor noise reduced audio signal.

The output of IFFT module 6 is then passed to multiplexor 7, which selects the output of delay module 2 or IFFT module 6 depending on whether or not the zoom motor is active.

Due to the noise level reduction, the noise level in the output signal will be different for processed and unprocessed audio. Therefore, a small amount of white noise is added in adder 8 to mask the artifact between the processed and unprocessed audio part. The level of white noise should be just sufficient to smooth the transit period and small enough to be inaudible.

Figure 2:
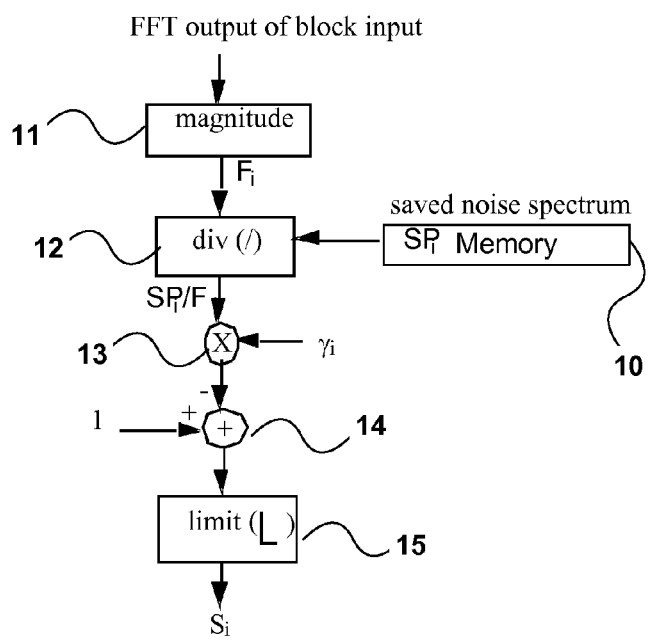
FIG. 2 is a block diagram of a scaling circuit.

The choice of a suitable scaling value is important in order to achieve both strong noise reduction and minimal voice distortion. FIG. 2 is a block diagram of a circuit for generating the scaling value $S_i$.

The average motor noise spectrum $SP_i$ is pre-stored in a memory 10. The output of the FFT module 4 is passed to magnitude module 11, which finds the magnitude of the signal Fi. This is then divided into the stored spectrum SPi in divider module 12 to produce the signal Spi/Fi. This is then multiplied by weighting factor $\gamma_i$ in multiplier and subtracted from 1 in subtractor 14.

The output of subtractor 14 is then passed through low limiter 15 to produce the scaling factor Si.

The purpose of the spectrum subtraction is to subtract motor noise from the input signal spectrum magnitude and maintain the phase information. Consequently, for each frequency bin, SPi has to be subtracted from the input signal magnitude Fi. This is equivalent to appropriately scaling the input signal with a scaling factor (1−SPi/Fi) as shown below:

$$F_i - SP_i = F_i \cdot \left(1 - \frac{SP_i}{F_i}\right)$$

With a little modification of the scaling factor, the scaling becomes $$1 - \gamma_i \cdot \frac{SP_i}{F_i}$$

where $\gamma_i$ is the weighting factor, which can be used to determine the amount of noise reduction.

The low limiter module 15 limits the scaling value and makes sure that it is always above $0 (S_i \geq 0)$.

Figure 3:
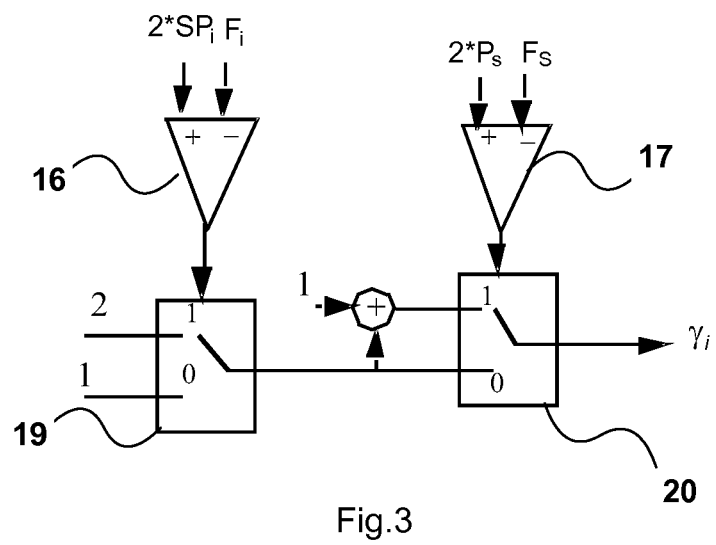
FIG. 3 is a block diagram for determining the weighting factor.

The circuit for calculating the weighting factor is shown in FIG. 3. It comprise an operational amplifier 16 with respective inputs 2*$SP_i$, $F_i$, and an operational amplifier 17 with respective inputs 2*$P_s$, $P_F$, where $P_s$, $P_F$ represent the signal power where $P_s$ is the average noise power in the block of FFT data and $P_F$ is the total signal power in the block of data.

In the case of a signal of normal strength the weighting factor is $\gamma_i=1$. When signal is very weak so that the signal power in a particular bin is less than 6 dB above the average noise spectrum SPi (Fi<2*SPi), the motor noise is more audible and the weighting factor increases by 1 to give more noise reduction. If the total signal power Fs in the block of FFT data is less than 6 Db of total average noise power Ps in the block (Fs<2*Ps), the weighting factor will increase by 1 again from adder 18. The overall purpose is to increase the noise reduction level if the motor noise dominates over the signal. Multiplexors 19, 20 select the output according to the above conditions output by the operational amplifiers 16, 17.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. The term circuit is used herein to encompass functional blocks that may in practice be implemented in software.

The invention can be implemented at low cost and allows automatic noise reduction level adjustment for different voice levels.

The invention claimed is:

1. A method of reducing zoom motor noise in an audio signal from a video camera, comprising:
   detecting activity of the zoom motor;
   transforming the audio signal into a frequency domain signal during zoom motor activity;
   scaling the frequency domain signal during zoom motor activity in each of a series of frequency bins by a scaling factor derived from a pre-stored zoom motor noise spectrum to produce a processed audio signal in the frequency domain; and
   transforming the processed audio signal back to the time domain, and
   wherein said scaling factor is given by the expression:

$$1 - \gamma_i \cdot \frac{SP_i}{F_i},$$

where $\gamma_i$ is a weighting factor, $SP_i$ is the noise spectrum of the zoom motor for each frequency bin i, and $F_i$ is the input signal magnitude in frequency bin i.

2. A method as claimed in claim 1, wherein during periods of zoom motor inactivity the audio signal is subjected to a delay to match the signal processing delay incurred during periods of zoom motor activity.

3. A method as claimed in claim 1, further comprising limiting the scaling factor of the processed audio signal to ensure that the processed signal in each frequency bin is always above zero.

4. A method as claimed in claim 1, further comprising adding white noise to the processed audio signal to match the noise level in said processed audio signal and said audio signal.

5. A method as claimed in claim 4, wherein the added white noise is about −50 dBm0.

6. A noise reduction circuit as claimed in claim 5, comprising a divider for dividing a magnitude of the transformed audio signal $F_i$ into $SP_i$, where $SP_i$ is the stored noise spectrum over the zoom motor for each frequency bin i, a multiplier for multiplying $$\frac{SP_i}{F_i}$$

by a weighting factor $\gamma_i$, and a subtractor for deriving the result $$1 - \gamma_i \cdot \frac{SP_i}{F_i}.$$

7. A noise reduction circuit as claimed in claim 6, comprising a multiplexor arrangement configured to set the weighting factor $\gamma_i$ to a first value during normal operation, to increase the weighting factor when the signal power in a particular bin is less than a threshold value above the average noise spectrum, and to reduce the weighting factor when the total signal power in a block of signal data is less than a threshold value of the total average noise power in the block.

8. A noise reduction circuit for reducing zoom motor noise in an audio signal from a video camera, comprising:
   a zoom motor activity detector;
   a signal processor configured to transform the audio signal into the frequency domain during zoom motor activity to obtain a frequency domain signal, scale the frequency domain signal in each of a series of frequency bins by a scaling factor derived from a pre-stored motor noise spectrum during zoom motor activity to produce a processed audio signal in the frequency domain, and transform the processed audio signal back to the time domain; and
   wherein said scaling factor is given by the expression:

$$1 - \gamma_i \cdot \frac{SP_i}{F_i},$$

where $\gamma_i$ is a weighting factor, $SP_i$ is the noise spectrum of the zoom motor for each frequency bin i, and $F_i$ is the input signal magnitude in frequency bin i.

9. A noise reduction circuit as claimed in claim 8, further comprising a bypass path including a delay circuit for subjecting the audio signal to a delay during periods of zoom motor inactivity to match the signal processing delay incurred during periods of zoom motor activity.

10. A noise reduction circuit as claimed in claim 8, further comprising a limiter for limiting the scaling factor of the processed audio signal to ensure that the processed signal in each frequency bin is always above zero.

11. A noise reduction circuit as claimed in claim 8, further comprising a white noise generator and an adder for adding white noise to the processed audio signal to match the noise level in said processed audio signal and said audio signal.

* * * * *